(12) United States Patent
Frankiewicz et al.

(10) Patent No.: US 9,739,541 B2
(45) Date of Patent: Aug. 22, 2017

(54) HEAT EXCHANGER

(71) Applicant: MAHLE International GmbH, Stuttgart (DE)

(72) Inventors: Tomasz Frankiewicz, Ostrow WLKP (PL); Michal Krystowiak, Pogorzela (PL); Piotr Lukaszczyk, Ostrow WLKP (PL)

(73) Assignee: MAHLE International GmbH, Stuttgart (DE)

(*) Notice: Subject to any disclaimer, the term of this patent is extended or adjusted under 35 U.S.C. 154(b) by 248 days.

(21) Appl. No.: 14/535,389

(22) Filed: Nov. 7, 2014

(65) Prior Publication Data

US 2015/0129188 A1 May 14, 2015

(30) Foreign Application Priority Data

Nov. 8, 2013 (EP) .................................. 13192105

(51) Int. Cl.
*F28F 9/02* (2006.01)
*F28D 7/16* (2006.01)
*B23P 15/26* (2006.01)

(52) U.S. Cl.
CPC ............... *F28D 7/16* (2013.01); *B23P 15/26* (2013.01); *F28F 9/0229* (2013.01); *F28F 2225/08* (2013.01); *Y10T 29/49368* (2015.01)

(58) Field of Classification Search
CPC ............................ F28F 2225/08; F28F 9/0229
USPC ........................................ 165/173, 174, 906
See application file for complete search history.

(56) References Cited

U.S. PATENT DOCUMENTS

| | | | | |
|---|---|---|---|---|
| 2,228,549 A * | 1/1941 | Young | ................... | F28F 9/0224 165/133 |
| 5,538,079 A * | 7/1996 | Pawlick | .............. | F28D 1/05366 165/153 |
| 6,644,392 B2 * | 11/2003 | Kalbascher | ........... | F28D 1/0535 165/173 |
| 8,656,988 B1 * | 2/2014 | Paul et al. | .......... | F28D 1/05366 165/151 |
| 2002/0023734 A1 * | 2/2002 | Wagner | ............... | F28D 1/05366 165/81 |
| 2006/0185833 A1 * | 8/2006 | Brost et al. | ......... | F28D 1/05366 165/149 |
| 2007/0267184 A1 * | 11/2007 | Freitag et al. | ........ | F28F 9/0226 165/159 |
| 2008/0000627 A1 * | 1/2008 | Noguchi et al. | .... | F28D 1/05366 165/173 |
| 2009/0183864 A1 * | 7/2009 | Schnittger et al. | . | F28D 1/05366 165/173 |
| 2010/0108304 A1 * | 5/2010 | Nies et al. | .......... | B21D 53/085 165/173 |

(Continued)

FOREIGN PATENT DOCUMENTS

FR 2770632 A1 * 5/1999 ........... F28D 1/0391

*Primary Examiner* — Allen Flanigan
(74) *Attorney, Agent, or Firm* — Brinks Gilson & Lione

(57) ABSTRACT

The disclosure presents a heat exchanger having flat tubes received in a double header plate. The double header plate includes a complementary arrangement of a main header plate and a reinforcement header plate. Slots are arranged in one of the header plate and complementary tabs are arranged in the other header plate. The tabs are configured to engage the slots to enable a complementary alignment of the two header plates.

7 Claims, 1 Drawing Sheet

(56) References Cited

U.S. PATENT DOCUMENTS

2012/0193083 A1* 8/2012 Zaffetti ............... F28D 9/0062
165/185

* cited by examiner

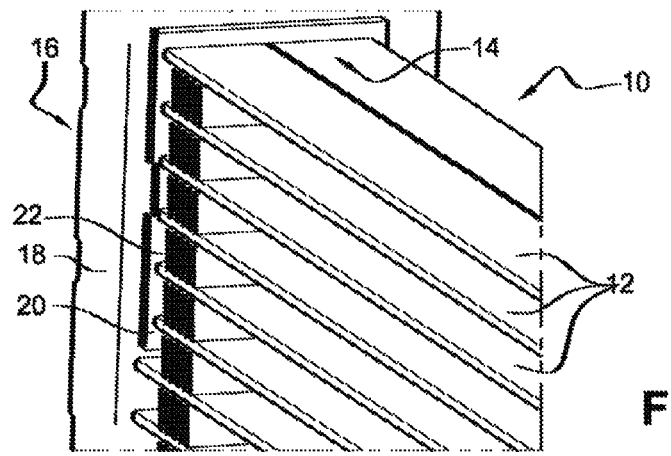
Fig. 1
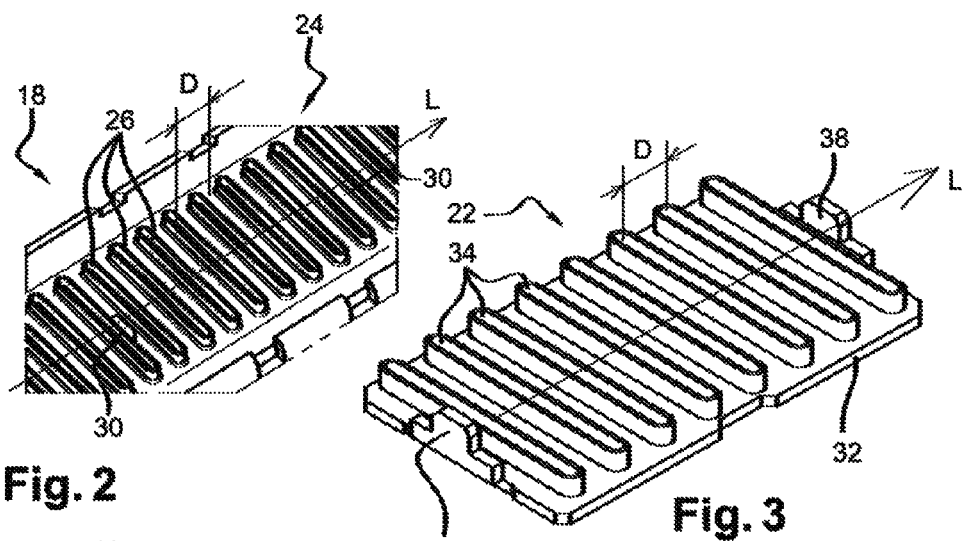
Fig. 2
Fig. 3
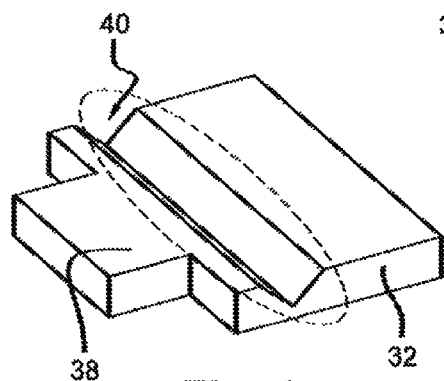
Fig. 4
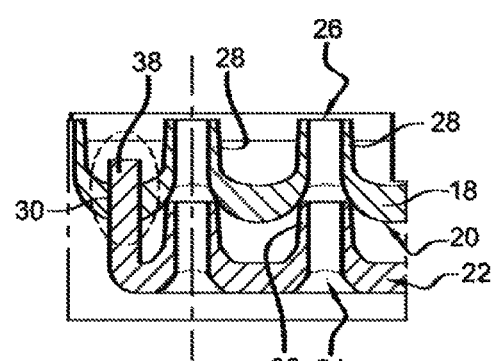
Fig. 5

HEAT EXCHANGER

CROSS REFERENCE TO RELATED APPLICATIONS

This application claims the benefit of European Patent Application Serial Number EP-13192105.8 for a HEAT EXCHANGER, filed on Nov. 8, 2013, which is hereby incorporated by reference in its entirety.

TECHNICAL FIELD

The present invention relates to a fluid-air heat exchanged as is arranged in the front module of a vehicle.

BACKGROUND OF THE INVENTION

A heat exchanger is typically a brazed assembly comprising two parallel reservoirs joined by transversal flat tubes in-between which are arranged corrugated fins. At least one of the reservoirs includes a header plate wherein the tubes are received in slots.

In operation, thermal constrains are important and cracks occur at the junction of tubes and the header plate and propagate within the brazed structure. In WO2007137866, a heat exchanger having a reinforcement plate is disclosed.

SUMMARY OF THE INVENTION

A heat exchanger solving the problems of formation of cracks at the junction of tubes and the header plate and propagating within the brazed structure is presented in this disclosure. More particularly, a heat exchanger having flat tubes received in a double header plate comprising a complementary arrangement of a main header plate and a reinforcement header plate. The reinforcement header plate is arranged against the main header plate.

Both header plates are provided with openings for arranging the flat tubes, the openings being surrounded by a peripheral wall, extending away from the header plate. The peripheral walls of the reinforcement plate extend toward the main header plate and the top edge of the peripheral walls of the reinforcement plate is at a maximum distance of 20 mm of the main header plate. In an exemplary embodiment, the peripheral walls of the reinforcement plate abut the main header plate.

Furthermore, the heat exchanger comprises means enabling a complementary alignment of the two header plates. The alignment means comprise slots arranged in one of the header plate and complementary tabs arranged in the other header plate, the tabs engaging in the slots. Also, the reinforcement plate is arranged around a sub-set of the tubes. A plurality of reinforcement plates may be arranged under one main header plate, each reinforcement plate receiving a sub-set of tubes. In the heat exchanger, the tubes extend between two main header plates, at least one having a reinforcement header plate.

The disclosure also presents a process to manufacture the heat exchanger as previously described. The process comprises the steps of:
  providing a first rectangular metal sheet having a long longitudinal side and a short transversal side,
  forming a main header plate by operating in said first sheet transversal openings and two slots, each slot being between two transversal openings,
  providing a second rectangular metal sheet having a long longitudinal side and a short transversal side,
  forming a reinforcement header plate by operating in said second sheet transversal openings with identical inter-opening distance as in the first sheet and,
  forming in said second sheet two tabs extending perpendicularly to the second sheet,
  assembling the header plates, by approaching the reinforcement header plate from the main header plate and engaging the tabs into the slots,
  providing flat tubes and, engaging said tubes through the openings of the reinforcement plate and of the main plate.
  forming the tabs in the second sheet by:
  cutting said second sheet along its short transversal sides so to form extending tabs coplanar with the sheet,
  operating a transversal notch at the junction of the tabs and the sheet so to create a weak line,
  bending the tab over the weak line so the tab extend perpendicularly to the sheet.

BRIEF DESCRIPTION OF THE DRAWINGS

The present invention is now described by way of example with reference to the accompanying figures.

FIG. 1 is an isometric view of a part of a heat exchanger as per the invention.

FIG. 2 is an isometric view of a main header plate of the heat exchanger of FIG. 1.

FIG. 3 is an isometric view of a reinforcement plate of the heat exchanger of FIG. 1.

FIG. 4 is a processing detail of a tab of the reinforcement plate of FIG. 3.

FIG. 5 is a longitudinal section of the heat exchanger of FIG. 1.

DESCRIPTION OF THE PREFERRED EMBODIMENTS

In reference to FIG. 1, a brazed fluid-air heat exchanger 10 is shown having a plurality of flat tubes 12 received at both extremities 14, where only one is represented, into a double header plate 16 which construction is detailed below. To improve the heat exchange, corrugated fins are arranged between the tubes 12.

The double header plate 16 comprises a main header plate 18 and, against its external face 20 visible on FIG. 1, a reinforcement header plate 22. The external face 20 designates the face external to the tank, not represented.

The main header plate 18 and the reinforcement plate 22 as well as their manufacturing processes are now described in reference to FIGS. 2, 3 and 4. The main header plate 18 is made in using a deformation process, such as punching, out of a first rectangular metal plate 24 mainly extending along a longitudinal axis L. Transversal openings 26 are operated across the width of the first plate 24 for receiving the tubes 12. The openings 26 have in the present embodiment been punched and are provided with a peripheral wall 28 protruding away from the plate 18. Furthermore, two rectangular slots 30 are cut in the middle of the transversal width of the first plate 24. As the illustration example of FIG. 2, height transversal openings 26 are between the slots 30. The main header plate 18 further comprises peripheral bent tabs enabling crimping of a tank, not represented. These are just illustrative examples as the teachings of the present invention may apply to any types of tanks.

Similarly to the main plate 18, the reinforcement plate 22 is made in using a deformation process, such as punching, out of a second rectangular metal plate 32 mainly extending along the longitudinal axis L. Transversal openings 34 are operated across the width of the second plate 32 for arranging the tubes 12. The openings 34, have in the present embodiment been punched, and are also provided with a peripheral wall 36 protruding away from the second plate 22. The inter-openings distance D is identical on the main header plate 18 and on the reinforcement plate 22. As the illustration example, the reinforcement plate 32 of FIG. 3 comprises height transversal openings 34. Furthermore, at the longitudinal extremities of the second plate 32, on the width of said plate 32, two rectangular tabs 38 are cut and bent. The distance between the two tabs 38 is equal to the distance between the two slots 30. To ease the bending of the tabs 38, a transversal V-notch 40, detailed in FIG. 4, is provided by the foot of the tabs 38, the notch 40 creating a weak line for bending.

The assembly of the double header plate 16 is now described in reference to FIG. 5 where can be observed that the reinforcement plate 22 is arranged against the external face of the main header plate 18, either in contact with the main plate 18 or at a small distance without exceeding 20 mm. The tabs 38 are complementary engaged into the slots 30 and the transversal openings 26, 34, of the heads are aligned. This mechanical arrangement requires manufacturing accuracy of the header plates 18, 22, so when assembling them together, the tabs engage the slots and the openings of both header plates are aligned enabling engagement of the tubes 12.

In the embodiment represented the reinforcement header plate (22) is symmetrical and can be assembled in engaging any of the tabs 38 in any of the slots 30.

The final assembly of the heat exchanger 10 consists in engaging the tubes 12 through the reinforcement plate 22, the extremities 14 engaging the peripheral walls 28 of the openings of the main header plate 18.

As can be seen, while the main header plate 18 receives all the tubes 12, the reinforcement plate 22 may be made to receive only few of the tubes 12. In the illustrative example of the figures, the reinforcement plate 22 receives height tubes 12 only. In such embodiment a double header plate 16 may comprises a plurality of reinforcement plates 22, each arranged against the external face 20 of the main header plate 18 receiving a sub-set of the tubes 12.

As well known in the art, the double header plate 16, the tubes 12 and the fins are brazed together after assembly.

Having described the invention, it is claimed:

1. A heat exchanger comprising a plurality of flat tubes received in a double header plate having a complementary arrangement of a main header plate and a reinforcement header plate,
   wherein the heat exchanger further comprises alignment means enabling a complementary alignment of the two header plates,
   wherein said alignment means comprise a plurality of slots arranged in one of the header plate and complementary tabs arranged in the other header plate such that the tabs engage in the slots to align the two header plates in a predetermined position,
   wherein the reinforcement header plate is arranged against the main header plate
   wherein both of the header plates have openings for arranging the flat tubes, each of the openings being surrounded by a peripheral wall extending away from the header plate, wherein the peripheral walls of the reinforcement plate extend in an orientation toward the main header plate and the peripheral walls of the main header plate extend in an orientation away from the reinforcement plate so that the orientations of the peripheral walls of both the main header plate and the reinforcement plate are the same.

2. The heat exchanger of claim 1, wherein a top edge of the peripheral walls of the reinforcement plate is at a maximum distance of 20 mm of the main header plate.

3. The heat exchanger of claim 2, wherein the top edge of the peripheral walls of the reinforcement plate abut the main header plate.

4. The heat exchanger of claim 3, wherein the reinforcement plate is arranged around a sub-set of the tubes.

5. The heat exchanger of claim 4, wherein a plurality of reinforcement plates are arranged under one main header plate, each reinforcement plate receiving a sub-set of tubes.

6. The heat exchanger of claim 5, wherein the tubes extend between two main header plates, at least one having a reinforcement header plate.

7. The heat exchanger of claim 1, wherein the tabs are formed on the reinforcement plate that defines a longitudinal plate axis, each of the tabs being bent over a weak line and extending perpendicularly to the longitudinal plate axis.

* * * * *